(12) United States Patent
Von Holdt

(10) Patent No.: US 6,171,094 B1
(45) Date of Patent: Jan. 9, 2001

(54) UNIVERSAL MOLD

(75) Inventor: John W. Von Holdt, 6864 Lexington La., Niles, IL (US) 60648

(73) Assignee: John W. von Holdt, Niles, IL (US)

(*) Notice: Under 35 U.S.C. 154(b), the term of this patent shall be extended for 0 days.

(21) Appl. No.: 08/145,867

(22) Filed: Nov. 1, 1993

(51) Int. Cl.$^7$ .................................................. B29C 45/17
(52) U.S. Cl. .......................... 425/190; 425/338; 425/588; 425/589; 425/451.3
(58) Field of Search ............................... 425/190, 192 R, 425/338, 451.3, 542, 588, 589, 572

(56) References Cited

U.S. PATENT DOCUMENTS

| | | | |
|---|---|---|---|
| 3,867,080 | * | 2/1975 | Bruder .................................. 425/572 |
| 4,077,759 | * | 3/1978 | Saumsiegle et al. ................. 425/572 |
| 4,408,981 | * | 10/1983 | Brown ................................. 425/589 |
| 4,753,592 | * | 6/1988 | Kaaden ............................... 425/588 |
| 4,929,166 | * | 5/1990 | DiSimone et al. ................. 425/451.3 |
| 5,145,353 | * | 9/1992 | Zakich ................................ 425/589 |
| 5,382,158 | * | 1/1995 | Herbst ................................ 425/589 |

FOREIGN PATENT DOCUMENTS

| | | | |
|---|---|---|---|
| 2395680 | * | 2/1979 | (FR) ..................................... 425/589 |
| 61-163820 | * | 7/1986 | (JP) ..................................... 425/589 |
| 62-233215 | * | 10/1987 | (JP) ..................................... 425/589 |

\* cited by examiner

*Primary Examiner*—James P. Mackey
(74) *Attorney, Agent, or Firm*—Banner & Wticoff, Ltd.

(57) ABSTRACT

A runner plate for an injection molding system comprises a plate typically having a plurality of corners, and typically apertures extending through the plate for receiving leader pins of the molding system for support of the plate in the molding system. Also at least a pair of outrigger supports may be provided, the outrigger supports being carried by the plate, each at a different position on the plate, and typically extending diagonally outwardly relative to adjacent plate edges. Also the outrigger support may carry rollers which are positioned to engage tie bars of the mold press for rolling contact therewith and support of the system. A mold which contains the runner plate may, by this invention, have leader pins that are longer than corresponding pins of the prior art, extending through the entire mold from, typically, the mold core on one side of the mold to a mold core on the other side of the mold, in the case of double action molds, with the leader pins being long enough to extend through the entire mold even in the open position, for added support. In such a circumstance, the outrigger supports may be dispensed with.

37 Claims, 3 Drawing Sheets

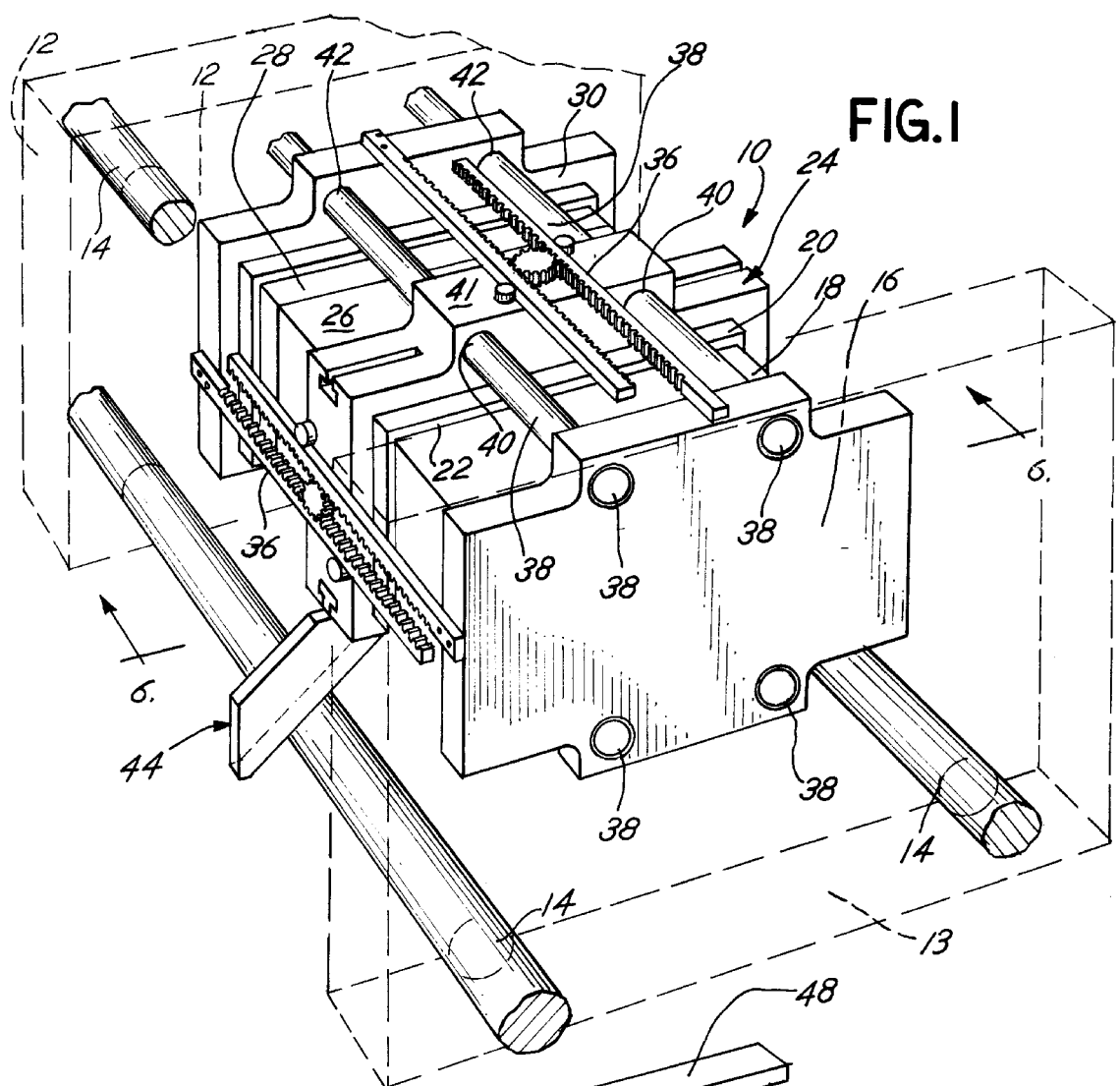
FIG.1
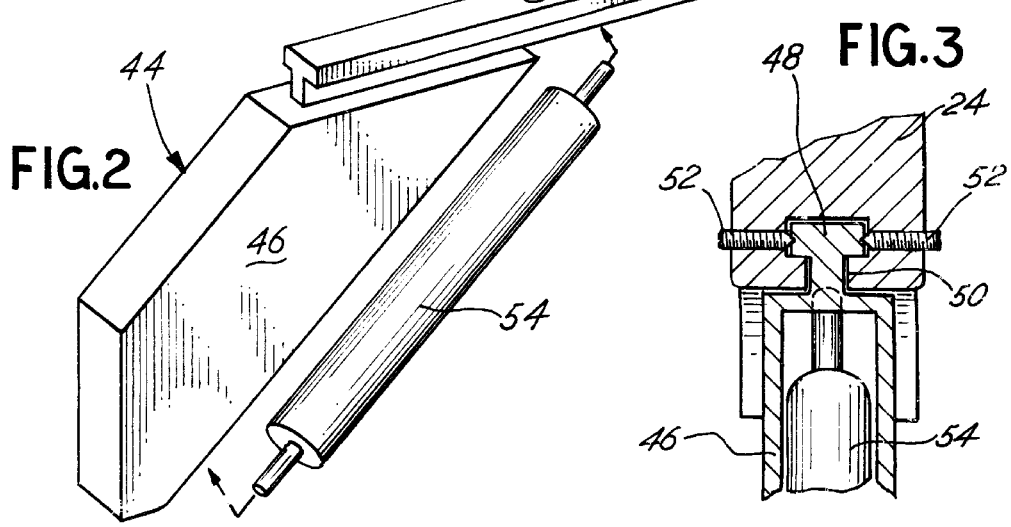
FIG.2
FIG.3

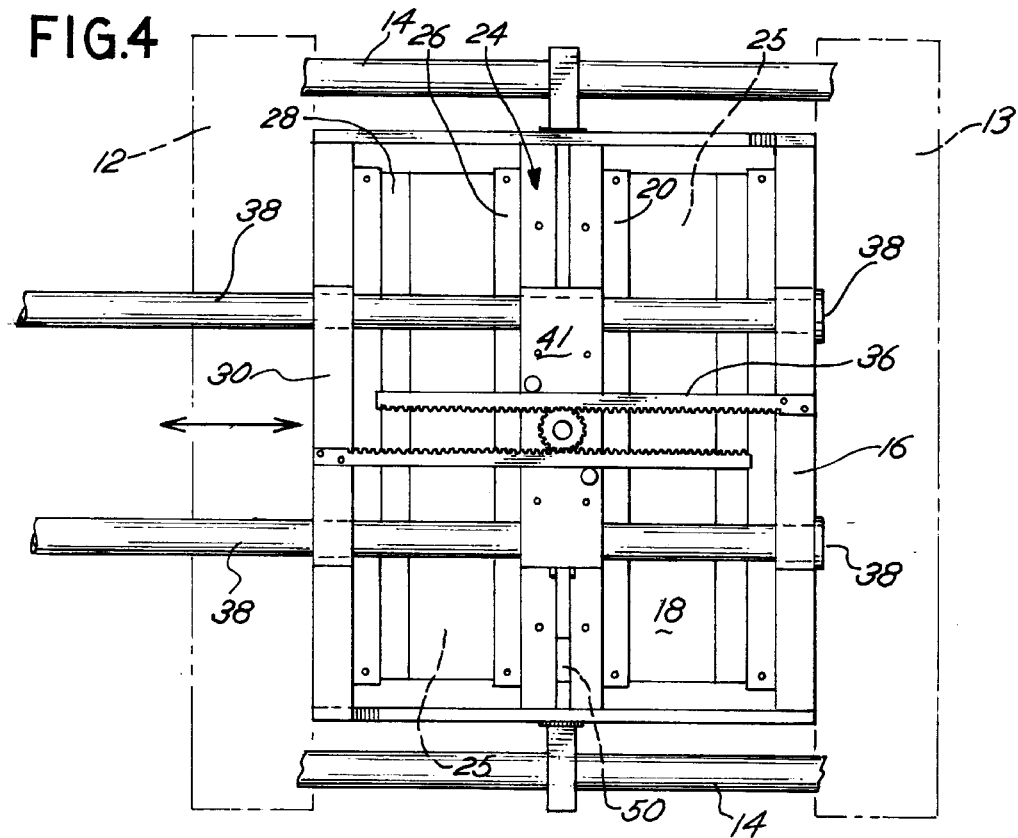
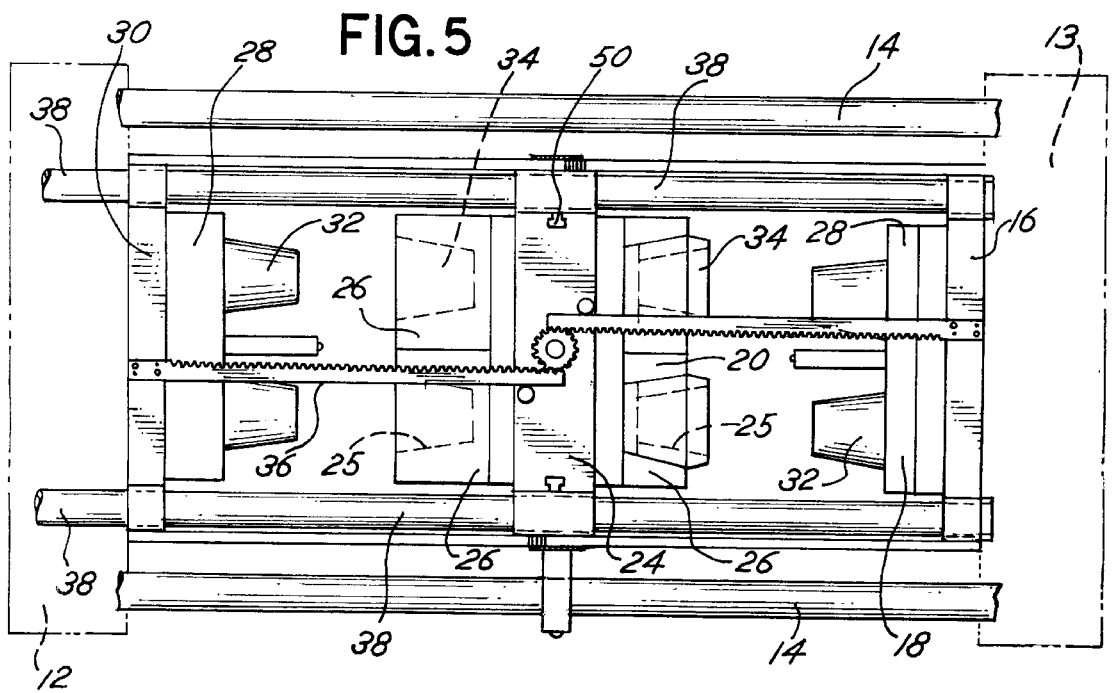

UNIVERSAL MOLD

BACKGROUND OF THE INVENTION

Injection molds for containers, lids, and the like are typically of a fairly complex construction, comprising mold plates, leader pins, bushings, a hot runner system, an ejection system, a water and/or air cooling system, an opening and closing mechanism, and often a mold outrigger support system. Furthermore, such molds generally must be specifically manufactured to fit the desired molding press. Molding machines or presses come in various sizes and capacities, ranging typically from 200 tons to 700 tons.

Conventional molds may have a runner plate, which is a plate that typically holds a mold cavity on one side thereof, or a pair of mold cavities on opposed sides, and which has conduits that supply molten molding compound to the respective sprues of the mold cavities. Runner plates may be supported by outriggers, extending from corners of a rectangular runner plate in prior art designs in a direction parallel to a rectangular side thereof and integrally attached thereto. These outriggers are proportioned to rest upon tie bars of a particular molding press. In the prior art, the outriggers must be of a particular design to engage the particular tie bars of the desired molding press, since various molding presses of differing capacities and manufacture have tie bars of different spacing and size.

Thus, it is typically impractical to switch a mold from operation in one molding press to another molding press of different design, for example a molding press of larger capacity. In the prior art, the outriggers of the runner plate are likely to fail to engage the differently spaced tie bars of another design or size of molding press.

Furthermore, in the prior art molds where the runner plate carries a pair of mold cavities in back-to-back relation, it is conventional for leader pins to be present for lateral bracing of the mold as it opens and closes. Typically, one set of leader pins extends from one of the mold cores, secured in stationary manner on a mold core plate, which, in turn, is secured to a platen of the mold press. The leader pins from this first mold core plate extend outwardly through a peripheral aperture in the runner plate, being long enough to continue engaging the runner plate in the mold-open position, but not significantly longer than that. Then, the other mold core, on the other side of the runner plate and which engages the corresponding mold cavity on the other side of the runner plate, carries another set of leader pins through its mold core plate which are long enough to extend through apertures in the periphery of the runner plate as the entire structure is moved between open and closed positions, but likewise not significantly longer.

Thus, when such a prior art mold is in its open position, the leader pins are near their maximum position of extension, where only essentially the tips of the leader pins occupy the apertures in the runner plate. They would disengage from the runner plate if the mold were open much further, but the mold is designed not to open further. However, there is a weakness of lateral stability created by this structure, that has in the prior art been dealt with by the use of the outriggers described above for added lateral stability.

In accordance with this invention, a mold is provided having improved lateral stability, with the mold also exhibiting a universal characteristic of use, in that the very same mold may be run in a variety of molding presses. For example, preferred molds may be run in a variety of molding presses which range in capacity from 150 tons to 700 tons.

This provides a significant and novel advantage, in that, in the prior art, it has typically been necessary to rebuild a mold with redesigned outriggers in order to switch its use from one press of one capacity or design to another press of a different capacity or design.

Further in accordance with this invention, one embodiment permits the elimination of the outrigger supports altogether, if that is desired.

Thus, a great improvement is provided with the mold of this invention.

DESCRIPTION OF THE INVENTION

In this invention, an injection mold is provided having a runner plate which comprises: a plate having a plurality of corners, apertures extending through the runner plate for receiving leader pins of the molding system for support of the plate. At least a pair of outrigger supports are provided, the outrigger supports being carried by the plate, each at a different edge portion of the plate and extending diagonally outwardly relative to adjacent plate edges. Because of the diagonal extension of the outrigger supports, they are capable of engagement with a variety of tie bars of differently sized mold presses, to facilitate the mounting of a mold having a runner plate in accordance with this invention in mold presses of different size or design.

Preferably, each outrigger support carries a roller which is positioned to engage the tie bars of the mold press in rolling contact therewith for support of the mold. Thus, sliding friction is greatly reduced in the mold operation.

Furthermore, the outrigger supports are adjustably positionable, as well as removable from, the runner plate, typically so that the same outrigger supports may be applied to the runner plate in a different position. For example, this permits the runner plate to be placed on the tie bars of a mold press with the long, transverse dimension of the runner plate being vertical, or, alternatively, with the long, transverse dimension of the runner plate being horizontal. This is typically accomplished by removing and replacing the outrigger supports at respective corners of the runner plate to permit this.

Specifically, each outrigger support carries a sliding projection, for example of T-shape, while at least three corners of the runner plate defines slots proportioned to receive and retain sliding projections of the outrigger supports. Thus, the pair of outrigger supports may be changed in their position on the runner plate between the respective corners, to permit changing of the runner plate position relative to the molding system between vertical and horizontal, for example. Also, the sliding projections may have a range of different positions in the runner plate slots so that the outrigger supports may be adjusted to engage differently-positioned tie bars of different mold presses. Means such as set screws may be used to hold the outrigger supports in their desired positions in the runner plate slots.

The runner plates may be broadly rectangular in shape, but typically carrying a pair of opposed side projections which define apertures carried adjacent the longest edges of the plate. The apertures of the side projections may receive the leader pins, which slide relative to the runner plate as the mold opens and closes. The side projections may typically be 18 to 30 inches in length along the longest edges, but less than the length of the longest edges of the runner plate. Specifically, a runner plate in accordance with this invention may have a length of 28 to 40 inches and a width of 14 to 28 inches, which dimensions accommodate a substantial variety of mold presses. A mold made in accordance with this invention may be interchangeably used in many of such presses.

Also, the molding system of this invention may comprise a pair of mold cavities carried on opposite sides of the runner plate, plus a pair of mold cores, each being positioned to engage one of the mold cavities in molding relation. Means are provided for moving the molding system between a mold-closed position of engaging mold cores and cavities, and a mold-open position, to permit removal of molded articles from the mold.

In accordance with this invention, the leader pins, which are carried by at least a first of the mold cores, extend through apertures in both of the mold cavities and/or the runner plate. By this invention, the leader pins are long enough to extend the entire mold length, through the other mold core on the opposite side of the mold, in the mold-open position, contrary to the molds of the prior art. In other words, in the mold of this invention, the leader pins may be approximately twice as long as in the prior art, extending in the mold-open position not only from one mold core through apertures in the runner plate, but the same pins continue onward for a distance sufficient to extend past both of the mold cavities and through the other mold core, which is positioned on the end of the mold opposite to the first mold core.

Typically, the leader pins are all positioned parallel to each other, extending in the same direction from single, stationary mold core, while the remainder of the mold opens and closes relative to that mold core. However, separate pins of similar length can be positioned to face each other if that is desired.

Because the leader pins engage and support all the components of the mold at all times, there is a great increase in the lateral stability of the mold. This stability is great enough that, in the presence of such an inventive improvement, outrigger supports for the runner plate can be eliminated in many circumstances if desired.

Preferably, the runner plates used in this invention carry a plurality of slots for removable mounting of at least a pair of the outrigger supports of this invention, for supporting engagement of tie bars of the molding system. However, in many circumstances such is not necessary when the elongated leader pins in accordance with this invention are used.

BRIEF DESCRIPTION OF THE DRAWINGS

In the drawings,

FIG. 1 is a perspective view of a mold made in accordance with this invention, also showing some parts of a conventional mold press in which it is mounted;

FIG. 2 is an exploded, perspective view of an outrigger for use with the mold of this invention;

FIG. 3 is a partial longitudinal sectional view taken through the outrigger of FIG. 2, with the outrigger shown to be mounted on the mold;

FIG. 4 is a plan view of the mold of FIG. 1, showing the mold in closed position;

FIG. 5 is an elevational view of the mold of FIG. 4, shown in the open position;

DESCRIPTION OF SPECIFIC EMBODIMENTS

Figure 6:
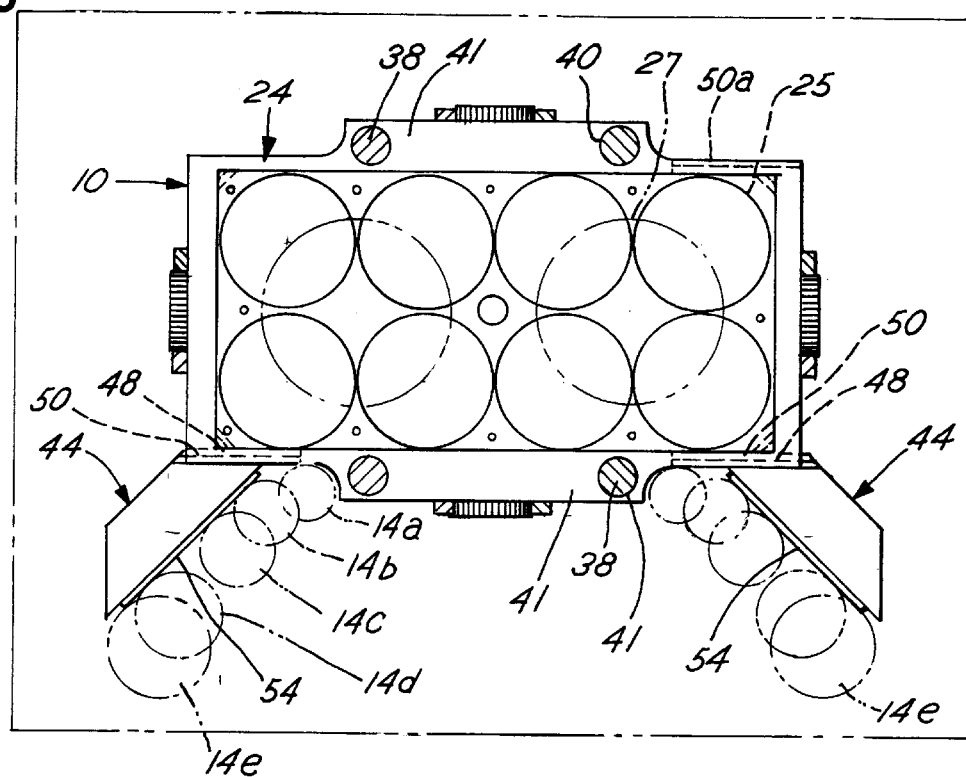
FIG. 6 is an elevational view of the runner plate of the mold shown in FIGS. 1–5, the runner plate having its outriggers mounted in a first position for horizontal mounting of the mold in the mold press.

Referring to the drawings, a multiple cavity injection mold 10 is shown in accordance with this invention, the mold being mounted in a mold press in FIG. 1, with platens 12, 13 and the tie bars 14 of the mold press being shown. The mold 10 and mold press illustrated herein may each be of known, commercial design except as otherwise indicated herein.

Platen 13 of the mold press is a stationary platen, while platen 12 is moveable by the mold press for a desired distance between open and closed mold positions. Components of mold 10 follow along, governed by rack and pinion mechanisms 36.

Figure 7:
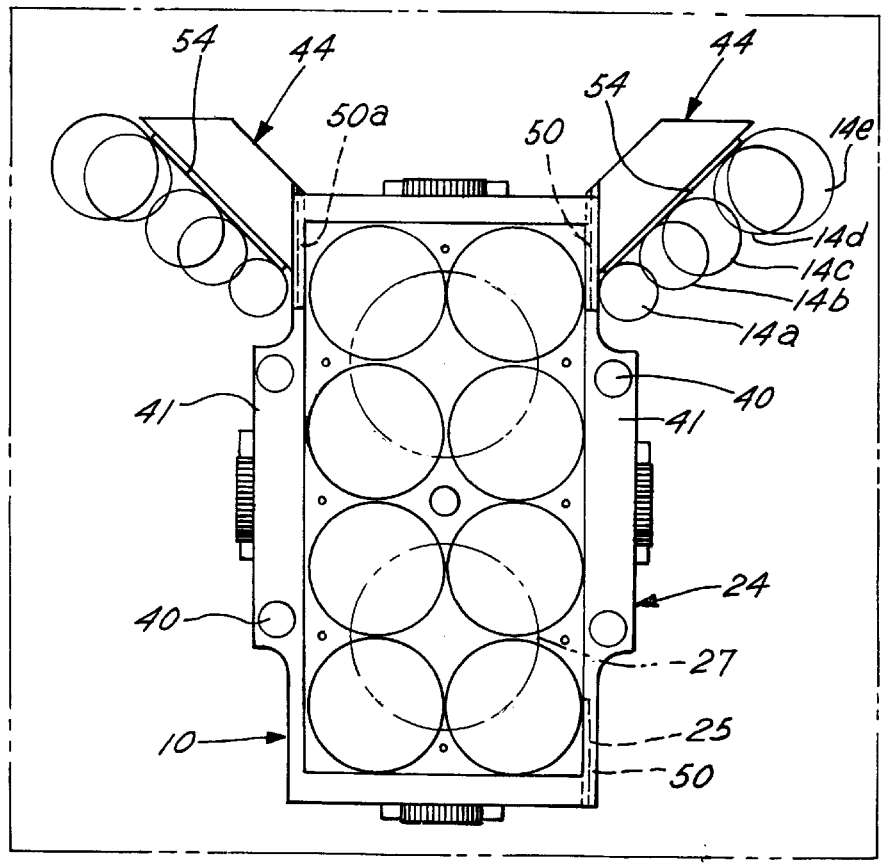
FIG. 7 is an elevational view of the same runner plate with the outriggers mounted in a different position for vertical mounting of the mold in the mold press.

Platen 13 carries a first mold core platen 16, to which is attached the first mold core 18. First mold cavity 20 is positioned in facing relation to mold core 18 along a parting line 22, with first mold cavity 20 being carried on one face of runner plate 24, which may be conventionally equipped with lines for delivering molten plastic through the respective sprues into the individual molding chambers 25, defined between core 18 and cavity 20 (FIGS. 5–7). Alternatively, larger molding chambers 27 may be defined by core 18 and cavity 20.

Runner plate 24 carries, on its other side, a second mold cavity 26, which engages mold core 28. Mold core 28 is carried on a plate 30 which, in turn, is bolted to platen 12 of the mold press.

As shown in FIG. 5, the respective mold core units 32 and mold cavity units 34 are shown, with the units engaging each other to define mold chambers 25 between them, for the molding action in accordance with common practice. It can be seen that the various mold core units 32 and mold cavity units 34 can vary in design as desired.

As is conventional, mold 10 is braced and controlled in its opening and closing motion by rack and pinion connections 36, which are conventional. One or two pairs of such opposed rack and pinion connections 36 may be provided for each mold.

In accordance with this invention, leader pins 38 are provided, being conventionally secured in apertures of mold core plate 16, and extending along the entire length of mold 10, passing through apertures 40 of runner plate 24, and also through apertures 42 of opposed mold core plate 30.

Rectangular side projections 41 are carried integral with the otherwise rectangular runner plate 24, with projections 41 extending along the longest edges of the runner plate, and defining apertures 40 for receiving the leader pins 38, which extend therethrough. The side projections 41 may be 20 inches in length along the longest rectangular edges of runner plate 24, with the longest runner plate edge being about 30 inches in length and the other rectangular edges thereof being about 16 inches, by way of specific embodiment.

Leader pins 38 are of a length sufficient to extend well beyond the other mold core plate 30 in the mold-closed position, as shown in FIGS. 1 and 4.

In accordance with this invention, leader pins 38 are of sufficient length, as shown in FIG. 5, to extend beyond the opposed mold core plate 30 even in the mold-open position, as shown. To the contrary, in prior art molds, the leader pins 38 are only of a length capable of extending from the respective mold core plates 16, 30 to a distance that only slightly beyond runner plate 24, so that the prior art leader pins are only about half the length of the leader pins 38 of this invention in a correspondingly-sized mold. By this invention, significant improvements in the lateral stabilization of the mold is achieved, so that outrigger supports may, if desired, be eliminated in many molding situations.

Further in accordance with this invention, mold 10 may carry at least a pair of outrigger supports 44, one such support 44 being positioned on each side of the mold to rest on a tie bar 14 of the mold press as shown in FIGS. 1, 6 and 7. When outrigger supports 44 are present, leader pins of conventional length may be used in the mold rather than these shown herein, as may be desired. Both are disclosed, however, for purposes of illustration. Also both may be used together if desired.

In accordance with this invention, outrigger supports 44 comprise an outrigger 46 (see FIG. 2) which is positioned in diagonal relation to runner plate 24. Outrigger 46 carries a projection 48 of T-shaped cross section as also shown in FIG. 3. Projection 48 is slidable into a T-slot 50 of runner plate 24, being retained in a desired position in slot 50 by pointed set screws 52, which can penetrate and engage the metal of projection 48 for firm retention of projection 48 in slot 50, so that outrigger support 44 is precisely positioned to rest upon tie bars 14, with mold 10 being in the proper position within the mold press.

Also, a roller 54 (see FIG. 2) is secured to each outrigger support 44 in a position so that each roller 54 engages a tie bar 14, so that frictional wear is greatly reduced as tie rods 14 move relative to outrigger support 44.

By this invention, as shown in FIG. 6, the outrigger supports 44 can be positioned with their projections 48 mounted in those slots 50 of runner plate 24 that permit the runner plate and the rest of the mold to be positioned horizontally in the molding press. A plurality of tie rods 14a–14e represent various positions of tie rods of various mold presses which are commercially available. It can be seen that the outrigger supports 44 may engage any or all of them, so that the mold 10 is usable with all of those molding presses. Outrigger supports 44 may slide horizontally from the viewpoint of FIG. 6 inwardly or outwardly as may be desired, for the best fitting relation with respect to the particular tie rods of the mold press chosen at any given time, being then secured in position by means of pointed set screws 52. If it is desired to use the mold 10 having runner plate 24 in another machine, outrigger supports 44 may be horizontally adjusted by loosening set screws 52, adjusting, and then retightening again to properly engage another tie bar in another position of the new mold press.

Turning to FIG. 7, when it is desired to use mold 10 with its runner plate 24 by installing it in vertical position in a mold press, an outrigger support 44 can be moved to occupy T-slot 50a, so that the same outrigger supports 44 assume a new configuration, permitting the mold to assume a vertical position in the mold press. Here also, the respective tie bars 14a–14d of various and differing mold presses may be engaged by rollers 54, for firm, low-friction retention of the mold on the tie bars as sliding motion takes place between the members. As before, outrigger supports 44 may be adjustable in their position in the respective slots to permit adjustment of the position of the mold relative to the tie bars and the remainder of the mold press.

Thus a mold is provided which is capable of operation with simple adjustment in a variety of commercially available mold presses, so that, if in a particular molding operation it is desired to use greater pressure, this can be easily accomplished without requiring significant modification of the mold, as would typically be currently necessary in prior art molds. Such molds may be used for the manufacture of any desired items, including large containers and their lids. Typically, the mold will operate in molding presses ranging from 200 tons to 700 tons capacity as a single level or a two level stack mold (which is the specific embodiment shown).

Since the mold of this invention may be mounted either vertically or horizontally, it can accommodate either a gravity drop system for retrieval of the molded parts, or a robot part removal system from the mold, since the mold can be operated both vertically and horizontally to facilitate that choice of system. Because the robot removal systems are useable with the horizontal arrangement of the mold as in FIG. 6, it becomes possible for the outrigger member 44 to be drawn inwardly as shown relative to the mold, which might interfere with gravity drop removal.

The molding system of this invention may be used in combination with the modular molding concept as disclosed in Von Holdt U.S. Ser. No. 07/878,674, filed May 5, 1992 and entitled Modular Molding System, now U.S. Pat. No. 5,262,116. Thus, Mold core and cavity modules may be interchangeable without removing the mold base out of the molding press or resetting the press shut height.

The above has been offered for illustrative purposes only, and is not intended to limit the scope of the invention of this application, which is as defined in the claims below.

That which is claimed is:

1. A runner plate for an injection molding system which comprises: a plate having a plurality of corners; apertures extending through said plate for receiving leader pins of the molding system for support of said plate in the molding system; and at least a pair of outrigger supports, said outrigger supports carried by said plate each at a different corner of said plate, and extending diagonally outwardly relative to adjacent plate edges.

2. The runner plate of claim 1 in which each outrigger support carries a roller which is positioned to engage tie bars of said molding system in rolling contact therewith for support of the system.

3. The runner plate of claim 1 in which said outrigger supports are removable from said runner plate and adjustable in their position relative thereto.

4. The runner plate of claim 3 in which each outrigger support carries a projection, and at least three of the corners of said runner plate define slots proportioned to receive and retain the projections of said outrigger supports in variable positions, whereby said pair of outrigger supports may be changed in their position on the runner plate to permit changing of the runner plate position in the molding system and to permit adjustable use thereof in different molding systems.

5. The runner plate of claim 1 in which said outrigger supports are elongated diagonally outwardly by a distance sufficient to alternatively engage the tie bars of differently sized molding machines.

6. The runner plate of claim 1 in which the corners of said plate comprise four corners in substantially rectangular arrangement.

7. A molding system which comprises a pair of mold cavities carried on opposite sides of the runner plate of claim 1; a pair of mold cores each positioned to engage one of said mold cavities in molding relation; leader pins extending through said mold cores, at least along said mold cavities, and through said runner plate; and means for moving said molding system between a mold-open and a mold-closed position, with the leader pins each being of sufficient length to extend through said mold cores and runner plate in the mold-open position.

8. The runner plate of claim 1 which has a length of 28 to 40 inches and a width of 14 to 28 inches.

9. The runner plate of claim 8 which is rectangular with a pair of opposed side projections which define said apertures carried adjacent the longer edges of said plate, said side projections being 18 to 30 inches in length and less than the length of the longer edges.

10. An injection molding system which comprises a pair of mold cavities attached on opposite sides of a runner plate; a pair of mold cores, each positioned to engage one of said mold cavities in molding relation; means for moving said molding system between a mold-open and a mold-closed position; and at least a pair of outrigger supports, said outrigger supports carried by said plate each at a different position on said plate, and extending outwardly relative to adjacent plate edges, each outrigger support being removable from said runner plate and of adjustable position relative thereto.

11. The molding system of claim 10 in which said molding system comprises tie bars for supporting the runner plate, each outrigger support carrying a roller which is positioned to engage said tie bars in rolling contact therewith for support.

12. The molding system of claim 11 in which each outrigger support carries a projection, and at least three of the corners of said runner plate define slots proportioned to receive and retain the projections of the outrigger supports in variable positions, whereby said pair of outrigger supports may be changed in their position on the runner plate to permit changing of the runner plate position in the molding system and to permit adjustable use thereof in different molding systems.

13. The molding system of claim 12 in which said plate comprises four corners in substantially rectangular arrangement, said plate having a length of 28 to 40 inches and a width of 14 to 28 inches, said plate also defining a pair of opposed side projections extending from the longer opposed rectangular edges, which side projection define apertures receiving leader pins, said side projections being 18 to 30 inches in length and less than the length of said longer edges.

14. A runner plate for an injection molding system, which comprises: a plate having at least a pair of outrigger supports, said outrigger supports being carried at spaced positions on said plate and extending diagonally outwardly relative to adjacent plate edges, each outrigger support carrying a roller which is positioned to engage tie bars of a molding system which carries a mold incorporating said runner plate, with said roller being positioned for rolling contact with said tie bars for support, said outrigger supports being removable from said runner plate.

15. The runner plate of claim 14 in which each outrigger support carries a projection, and at least three spaced slots of said runner plate proportioned to receive and retain the projections of said outrigger supports in variable positions, whereby said pair of outrigger supports may be changed in their position on the runner plate to permit changing of the runner plate position in the molding system, and to permit adjustable use thereof in different molding systems.

16. The runner plate of claim 15 in which said outrigger supports are elongated diagonally outwardly by a distance sufficient to alternatively engage tie bars of differently-sized molding machines.

17. The runner plate of claim 15 in which the corners of said plate comprise four corners in substantially rectangular arrangement, said runner plate having a length of 28 to 40 inches and a width of 14 to 28 inches and defining a pair of opposed rectangular sides that are longer than another pair of opposed, rectangular sides, said runner plate defining a pair of opposed side projections extending from said longer opposed rectangular sides, said side projections defining apertures for receiving leader pins for supporting the runner plate in a mold, said side projections being 18 to 30 inches in length and less than the length of the longer edges.

18. The runner plate of claim 15 in which pointed, metal penetrating set screw means are positioned to engage the projections of said outrigger supports in said slots of the runner plate, to lock the projections and outrigger supports in a fixed, adjustable, desired position within said slots.

19. A runner plate for an injection molding system, which comprises: a plate which carries at least a pair of outrigger supports in spaced relation thereon, said outrigger supports each carrying a roller which is positioned to engage tie bars of a mold press in rolling contact therewith for support of the runner plate.

20. The runner plate of claim 19 in which said outrigger supports are removable from said runner plate and adjustable in their position relative thereto.

21. The runner plate of claim 20 in which each outrigger support carries a projection, said runner plate defining at least three spaced slots which are proportioned to receive and retain the projections of said outrigger supports in variable positions, whereby said pair of outrigger supports may be changed in their position on the runner plate to permit changing of the runner plate position in the molding system and to permit adjustable use thereof in different molding systems.

22. The runner plate of claim 21 in which pointed, metal penetrating set screw means are positioned to engage the projections of said outrigger supports in said slots of the runner plate, to lock the projections and outrigger supports in a fixed, adjustable, desired position within said slots.

23. For use in a molding press having a fixed platen, a movable platen, and four tie bars interconnecting said platens and on which said movable platen slides, said tie bars being located generally in the areas of the corners of said platens, the improvement comprising a mold designed for interchangeable use in various molding presses of different sizes where said tie bars are spaced different distances apart depending upon the size of said molding press, said mold including, in combination, a first runner plate, a second mold core plate mounted on said fixed platen, a third mold core plate mounted on said movable platen, mold cores mounted on inside walls of said second and third mold core plates, and mold cavities mounted on opposite sides of said first runner plate for cooperation with said mold cores, said first, second and third plates being generally rectangular but having at least one projection on one portion of each of the longer opposed sides of each of said plates thereby defining at least one recessed area on a remaining portion of each of said longer opposed sides, said first, second and third plates being arranged to accommodate said tie bars in said recessed areas adjacent to said projections.

24. The invention of claim 23 where said three plates are arranged with said longer sides horizontal, said one projection being formed on an upper side of each said plate and a corresponding said projection being formed on a bottom side of each said plate.

25. The invention of claim 23 where said three plates are arranged with said longer sides vertical, one said projection being formed on a left side of each said plate and a corresponding said projection being formed on a right side of each said plate.

26. The invention defined in any of claims 23, 24 or 25 including a plurality of leader pins which extend through corresponding holes in said projections in each of said first, second and third plates for support of said first runner plate.

27. The invention of claim 26 where there are at least four of said leader pins arranged in a rectangular array.

28. The invention of claim 23 where said one projection on each of said two longer sides of said first, second and third plates comprises a perpendicular projection which extends longitudinally along said longer side and is located intermediate the ends of said longer side to define recessed areas at the said ends of each of said longer sides on each of said plates, said recessed areas serving to accommodate said tie bars in different locations depending on the size of said molding press, and a plurality of leader pins which extend through corresponding holes in said perpendicular projection in each of said first, second and third plates for support of said first runner plate.

29. The invention of claim 28 where each of said plates is arranged with said longer sides extending vertically.

30. The invention of claim 28 where each of said plates is arranged with said longer sides extending horizontally.

31. The invention of claim 23 including at least a pair of adjustable outrigger supports carried on opposite corners of said first runner plate and extending diagonally outwardly relatively to adjacent edges of said first runner plate, said outrigger supports being adjustably positioned to sit on corresponding ones of said tie bars to afford support for said first runner plate.

32. The invention of claim 31 including a plurality of leader pins which extend through corresponding holes in said projections in each of said first, second and third plates for support of said first runner plate.

33. The invention of claim 32 where said first, second and third plates are arranged horizontally and said pair of outrigger supports extend laterally outwardly and downwardly from bottom corner areas thereof.

34. The invention of claims 32 where said first, second and third plates are arranged vertically and said pair of outrigger supports extend laterally outwardly and upwardly from upper corner areas thereof.

35. For use in a molding press having a fixed platen, a movable platen, and four tie bars interconnecting said platens and on which said movable platen slides, the improvement comprising a mold, said mold including, in combination, a first runner plate, a second mold core plate mounted on said fixed platen, a third mold core plate mounted on said movable platen, mold cores mounted on inside walls of said second and third mold core plates, mold cavities mounted on opposite sides of said first runner plate for cooperation with said mold cores, and a plurality of leader pins which extend through corresponding holes each of said first, second and third plates for support of said first runner plate, said leader pins extending from said second mold core plate to said third mold core plate in a mold-open position so that the opposed ends of each of said leader pins are supported by one of said second and third mold core plates, whereby said leader pins are supported at both ends and said leader pins support said first runner plate.

36. The invention of claim 35 where four of said leader pins are provided, said leader pins being arranged generally in a rectangular array.

37. The invention of claim 35 where said first, second and third plates are generally rectangular but have at least one projection on one portion of each of the longer opposed sides of each of said plates thereby defining at least one recessed area on a remaining portion of each of said longer opposed sides, said first, second and third plates being arranged to accommodate said tie bars in said recessed areas adjacent to said projections.

* * * * *